United States Patent [19]

Drexhage

[11] Patent Number: 4,524,204

[45] Date of Patent: Jun. 18, 1985

[54] PROCESS FOR REPLACING ANIONS OR ORGANIC CATIONIC SALTS

[75] Inventor: Karl H. Drexhage, Siegen, Fed. Rep. of Germany

[73] Assignee: Eastman Kodak Company, Rochester, N.Y.

[21] Appl. No.: 174,959

[22] Filed: Aug. 4, 1980

[51] Int. Cl.$^3$ .................. C07D 265/38; C07D 311/60; C07D 335/02; C07D 409/06
[52] U.S. Cl. ..................... 544/103; 549/13; 549/60; 549/406; 549/415
[58] Field of Search ............... 542/454, 448; 544/103; 549/13, 60, 406, 415; 260/345.9 R

[56] References Cited

U.S. PATENT DOCUMENTS 3,417,083 12/1968 Reynolds et al. .................. 542/448

OTHER PUBLICATIONS

Sauter, Research Disclosure, vol. 148, No. 14831, (1976).
Drexhage et al., Chem Abstracts, vol. 90, Abst. No. 213,167e, (1979).
Drexhage et al., Research Disclosure, vol. 178, pp. 85–87, (1979).

Primary Examiner—Robert W. Ramsuer
Attorney, Agent, or Firm—Arthur H. Rosenstein

[57] ABSTRACT

A process for replacing and recovering the anion of an acid-stable organic cationic salt comprises the steps of:
(a) preparing a first dispersion or solution by combining
 (i) a first acid-stable, organic cationic salt having an anion,
 (ii) a water-immiscible organic solvent, and
 (iii) the acid of a solubilizing anion, thereby forming (1) a second organic cationic salt having said solubilizing anion, and (2) an acid of said anion of said first organic cationic salt, and (3) an excess, if any, of an acid of said solubilizing anion, said second organic cationic salt having a solubility in 2-ethoxyethanol:2-methoxyethyl acetate (1:1 by weight) at least 5 percent greater than said first organic cationic salt;
(b) removing the acid formed in said first dispersion or solution by, at least once
 (i) mixing water with said first dispersion or solution to form a mixture comprising (1) said first dispersion or solution, and (2) a second solution comprising water, at least a portion of the acid formed in said first solution, and at least a portion of an excess of said acid of said solubilizing anion, and
 (ii) separating said first dispersion or solution from said second solution; and
(c) recovering said second organic cationic salt having said solubilizing anion from said first dispersion or solution.

The process is particularly useful in the replacement of perchlorate anions of photo-bleachable cationic dye salts with trifluoroacetate or heptafluorobutyrate anions to substantially increase the solubility of the cationic dye salts in organic solvents.

22 Claims, No Drawings

PROCESS FOR REPLACING ANIONS OR ORGANIC CATIONIC SALTS

BACKGROUND OF THE INVENTION

1. Field of the Invention

This invention relates to processes for replacing anions of organic cationic salts, and more particularly to processes for replacing anions of cationic salts, particularly dye salts, with solubilizing anions.

2. Description Relative to the Prior Art

It is well known in the art to employ organic cationic salts for many purposes. Organic cationic salts include dyes, such as spectral sensitizing dyes and photobleachable dyes; development accelerators and development restrainers; ionic surface active agents; mordants; photographic stabilizers; bleachable antihalation dyes; optical filters and the like. Many of the physical and chemical characteristics of organic cationic salts, such as the optical properties of cationic dye salts, are determined by the organic cationic portion of the molecule and are essentially independent of the anion. However, the anion plays an important role in determining the solubility of the salt. For example, organic cationic salts are frequently isolated as perchlorate salts or tetrafluoroborate salts, which exhibit low solubility and good crystallinity. However, the solubility of these salts is too low for many applications, such as in coating very thin layers having a high organic cationic salt concentration. In order to increase the solubility, anions such as perchlorate or tetrafluoroborate are replaced with anions which increase the solubility of the cationic salts in organic solvents.

Several methods of replacing anions of organic cationic salts are known. One method comprises treating a water-soluble organic cationic salt, such as a pyrilium salt, with the acid or salt of the desired anion. However, this method is not applicable to all organic cationic salts, such as those which are water-insoluble.

Another method comprises treating an iodide salt of an organic cation with propylene oxide and the acid of the desired anion, as reported in Research Disclosure 14831 (1976). However, this method is applicable only to the iodide and some bromide salts of pyrilium and cyanine dyes.

The use of an ion exchange resin is described by Research Disclosure 14831 and by a publication of Curran and Strohl, Phot. Sci. Eng., 21, 148 (1977). However, this method requires large quantities of solvent to dissolve organic cationic salts having limited solubilities, and is extremely time consuming. Further, impurities in the final product can be introduced by the exchange resin, and the method is characterized by low yields.

In another procedure, an adduct of the organic cationic salt is isolated and then reacted with an acid of the desired anion. This procedure is only applicable if the organic salt forms a suitable adduct and, even then, the basic conditions employed may cause side reactions which contaminate the product.

It is thus seen that a process for conveniently replacing commonly encountered anions of both water-soluble and water-insoluble organic cationic salts with solubilizing anions is extremely desirable. It is further seen that such a process should produce an organic cationic salt of high purity and in high yields.

SUMMARY OF THE INVENTION

A process has now been found which meets the above criteria. This process is based on the differential partitioning between water and a water-immiscible organic solvent of the acids of the anions to be replaced and the replacing, solubilizing anions. Anions of organic cationic salts can be replaced by:

(a) preparing a first dispersion or solution by combining
  (i) a first acid-stable, organic cationic salt having an anion,
  (ii) a water-immiscible organic solvent, and
  (iii) the acid of a solubilizing anion, thus forming (1) a second organic cationic salt having said solubilizing anion, and (2) an acid of said anion of said first organic cationic salt, wherein said second organic cationic salt has a solubility in 2-ethoxyethanol:2-methoxyethyl acetate (1:1 by weight) at least 5 percent greater than said first organic cationic salt, and (3) an excess, if any, of an acid of said solubilizing anion;

(b) removing the acid formed in said first dispersion or solution by, at least once
  (i) mixing water with said first dispersion or solution to form a mixture comprising (1) said first dispersion or solution, which contains said second organic cationic salt having said solubilizing anion, and (2) a second solution comprising water, at least a portion of the acid formed in said first solution, and at least a portion, preferably all, of any excess of said acid of said solubilizing anion, and
  (ii) separating said first dispersion or solution from said second solution; and (c) recovering said second organic cationic salt having said solubilizing anion from said first dispersion or solution.

The above-described process is quite simple, requires only a short time, produces organic cationic salts of the desired solubility and purity, in high yields, and is applicable to all organic cationic salts provided they are acid-stable.

In another embodiment, perchlorate or tetrafluoroborate anions of organic cationic salts can be replaced by:

(a) preparing a first dispersion or solution by combining
  (i) a first acid-stable, organic cationic salt having a perchlorate or tetrafluoroborate anion,
  (ii) a water-immiscible organic solvent, and
  (iii) the acid of a solubilizing anion, thereby forming (1) a second organic cationic salt having said solubilizing anion, and (2) an acid of said anion of said first organic cationic salt, wherein said second organic cationic salt has a solubility in 2-ethoxyethanol:2-methoxyethyl acetate (1:1 by weight) at least 5 percent greater than said first organic cationic salt, and 3) an excess, if any, of an acid of said solubilizing anion;

(b) removing the acid formed in said first dispersion or solution by, at least once
  (i) mixing water with said first dispersion or solution to form a mixture comprising (1) said first solution, and (2) a second solution comprising water, at least a portion of the acid formed in said first dispersion or solution, and at least a portion of any excess of said acid of said solubilizing anion, and
  (ii) separating said first dispersion or solution from said second solution; and (c) recovering said second organic cationic salt having said solubilizing anion from said first dispersion or solution.

In a further embodiment of the invention, perchlorate or tetrafluoroborate anions of organic cationic salts are replaced with halogenated solubilizing anions such as trifluoroacetate or heptofluorobutyrate in the manner described above. In a still further embodiment, the halogenated solubilizing anions of the organic cationic salts are subsequently replaced by sulfonate anions by at least once mixing the salts having halogenated anions with an excess of the non-volatile acid of the desired sulfonate anion, evaporating the halogenated acid formed by the exchange, and extracting the mixture with water to remove the excess non-volatile acid of the desired sulfonate anion.

DETAILED DESCRIPTION OF THE PREFERRED EMBODIMENTS

The novel process for replacing the anion of an organic cationic salt comprises the steps of:

(a) preparing a first dispersion or solution by combining
  (i) a first acid-stable, organic cationic salt having an anion,
  (ii) a water-immiscible organic solvent, and
  (iii) the acid of a solubilizing anion, which forms (1) a second organic cationic salt having said solubilizing anion, and (2) an acid of said anion of said first organic cationic salt, and (3) an excess, if any, of an acid of said solubilizing anion, said second organic cationic salt having a solubility in 2-ethoxyethanol:2-methoxyethyl acetate (1:1 by weight) at least 5 percent greater than said first organic cationic salt and any excess of acid of said solubilizing anion;

(b) removing the acid formed in said first dispersion or solution by, at least once
  (i) mixing water with said first dispersion or solution to form a mixture comprising (1) said first dispersion or solution, which contains said second organic cationic salt having said solubilizing anion, and (2) a second solution comprising water, at least a portion of the acid formed in said first dispersion or solution, and at least a portion of any excess of said acid of said solubilizing anion, and
  (ii) separating said first dispersion or solution from said second solution; and (c) recovering said second organic cationic salt having said solubilizing anion from said first dispersion or solution.

A wide variety of organic cationic salts are known in the art and any of these which are acid-stable are useful in the practice of the present invention. The term "acid-stable" as used herein denotes materials having an organic structure which is not irreversibly changed by acids having a $pK_a$ of less than about 3. By "organic cationic salt" it is meant a salt wherein the cationic portion is an organic moiety.

Anions of the organic cationic salt which are replaced by the above process include perchlorate; tetrafluoroborate; and halides, such as bromide, chloride and iodide. Organic cationic dyes are precipitated out of reaction mixtures as perchlorates or tetrafluoroborates because of their low solubility and good crystallinity. Thus, perchlorates and tetrafluoroborates are the most frequently encountered, and, hence, preferred anions to be replaced, with perchlorates being the most preferred.

Examples of salts which are useful in the described manner include perchlorates, fluoroborates, iodides, bromides and the like. Cationic dye salts are especially preferred.

Solubilizing anions are those which increase the solubility of the organic cationic salt by at least 5 percent compared to the anion presently in the salt, e.g., from about 5 percent to about 25 percent, in a one to one 2-ethoxyethanol:2-methoxyethyl acetate mixture by weight. Useful solubilizing anions include halogenated anions such as trifluoroacetate and heptafluorobutyrate.

While the solubilizing anions of the invention are described as those which increase the solubility of their organic cationic salt by at least 5 percent in one to one by weight 2-ethoxyethanol:2-methoxyethyl acetate, solubility is increased in organic solvents such as acetone, methanol, ethanol, ethyl acetate, methoxyethanol, ethoxyethanol and 2-methoxyethyl acetate as well.

Acids of solubilizing anions employed in the process are generally strong organic acids having a $pK_a$ equal to or below about 1.0. Useful acids include trifluoroacetic, trichloroacetic, heptafluorobutyric and the like acids.

Any water-immiscible organic solvent is useful. The preferred water-immiscible organic solvent will, of course, depend upon the anion to be replaced, the solubilizing anion selected, and the organic cation. Suitable water-immiscible organic solvents which are useful in the process of the invention include chlorinated solvents, such as dichloromethane, 1,2-dichloroethane, chlorobenzene, chloroform, trichloroethylene, methyl chloroform an propylene dichloride; aromatic solvents such as benzene; ethers such as diethyl ether and the like. Preferably, the water-immiscible organic solvent is a chlorinated solvent, most preferably dichloromethane.

The first dispersion or solution (as used herein, the term solution includes dispersion) is prepared by combining the first organic cationic salt, the water-immiscible organic solvent, and the acid of the solubilizing anion. The concentration of a dispersion or solution comprising the first organic cationic salt and the water-immiscible organic solvent can be varied widely to the extent that accurate weighing and volume measurements are not required. However, the concentration of the first organic cationic salt in the solvent is preferably about 1 to 10 percent by weight and most preferably is about 130 grams/liter.

The ration (by volume) of the water-immiscible organic solvent to the acid of the solubilizing anion varies widely, to the extent that accurate volume measurements are not required, as stated above. However, the volume ratio of the water-immiscible solvent to the acid of the solubilizing anion ranges from about 5:1 to 10:1.

The approximate volume ratios and concentrations described above are applicable with any order of addition employed in the process. Preparation of the first dispersion or solution in step (a) is accomplished by:

(1) dissolving the organic cationic salt in the water-immiscible organic solvent, and subsequently adding the acid of the solubilizing anion;

(2) mixing the organic cationic salt with the acid of the solubilizing anion, and subsequently adding the water-immiscible organic solvent; or (3) mixing the water-immiscible organic solvent and the acid of the solubilizing anion, and subsequently adding the organic cationic salt.

The preferred order of addition comprises dissolving the organic cationic salt in the water-immiscible organic solvent, and subsequently adding the acid of the solubilizing anion.

The preparation of the first solution results in the formation of an organic solvent mixture containing a second organic cationic salt having said solubilizing anion, an acid of said anion of said first organic cationic salt and any excess of the acid of said solubilizing anion.

Although it is preferred that the acid of the solubilizing anion completely react with the first cationic salt, some excess may result if not all of the acid is used in the reaction.

The first dispersion or solution thus formed is generally mixed with any amount of water and preferably about an equal volume of water to form a second solution, which is a mixture comprising an aqueous phase and an organic phase. The aqueous phase comprises water, at least a portion of any excess of the acid of the solubilizing anion, and at least a portion of the acid formed in the first solution. Preferably all of the acid formed in the first dispersion or solution will be in the acid solution.

The simplest method for separating the first dispersion or solution, i.e., the organic phase (comprising the water-immiscible organic solvent containing the organic cationic salt) from the aqueous phase (comprising water, at least a portion of the acid formed by the replaced anion, and the excess of the acid of the replacing solubilizing anion), is accomplished by allowing the mixture to stand until two immiscible layers form. The time for separation of the mixture into the two immiscible layers varies from about 1 to about 5 minutes. The immiscible layers so formed are optionally physically separated by drawing off the lower layer, for example, by means of a release valve in the lower portion of the containing vessel, or by drawing off the upper layer by floating or inserting a suction device into the upper layer. The desired organic layer containing the organic cationic salt is retained for further extractions, if desired, or for recovery of the organic cationic salt having a solubilizing anion. When dichloromethane is employed as the water-immiscible organic solvent, the bottom layer is the desired layer, and the upper layer is optionally discarded. In general, the layer comprising water, the acid formed by the replaced anion, and the excess of the acid of the replacing solubilizing anion, is discarded.

The number of times the mixture comprising the water-immiscible organic solvent and the organic cationic salt having an anion is mixed with the acid of a solubilizing anion and water to replace at least a portion of the anion with a solubilizing anion, and subsequently separated from the mixture, is determined by balancing the degree of ion exchange required to produce the desired solubility against costs incurred in large scale production. The number of extractions employed usually vary between 1 to 5. Normally 2 to 3 repeated extractions are used to provide the desired degree of ion exchange.

The temperatures employed in the process of the present invention is subject to wide variation and is not critical. The temperature is generally about room temperature. Most often it is in the range of about 15° to about 25° C. The process optionally is carried out at subatmospheric or superatmospheric pressures, but typically the process is carried out at atmospheric pressure. It is preferred that the pressure-temperature combination be such that the solubility relationships of the water-immiscible organic solvent, the acid of the solubilizing anion, and water employed in the process are maintained to facilitate the replacement of the anion of the organic cationic salt with the solubilizing anion. Other factors affecting the temperature and pressure selected for the process include the freezing points and boiling points of the water-immiscible organic solvent, the acid of the solubilizing anion and water. Generally, the above compounds should be liquid at the temperature and pressure employed.

The method of recovery in step (c) of the process described above includes: evaporation of at least a portion, and preferably all, of the water-immiscible organic solvent to effect crystallization of the organic cationic salt; and precipitation in a non-solvent such as ether, ligroin or any other procedure suitable for this purpose. The preferred method of recovery is evaporation of at least a portion of the water-immiscible organic solvent to effect crystallization of the organic cationic salt having a solubilizing anion.

In an alternative embodiment of the present invention, the second organic cationic salt serves as the starting material for further anion exchanges to obtain, for example, less soluble salts having anions such as $I^-$, $Br^-$, $Cl^-$, $BF_4^-$, $PF_6^-$ and the like. Further, when the second organic salt has a halogenated solubilizing anion such as trifluoroacetate, organic cationic salts having other solubilizing anions such as 1-butanesulfonate, 1-octanesulfonate, p-toluenesulfonate and the like, are optionally prepared by at least once mixing the salt having the halogenated anion with an excess of the non-volatile acid of the desired anion, evaporating the halogenated acid formed by the exchange, and extracting the mixture with water to remove the excess non-volatile acid of the desired anion. It is thus seen that by the process of the invention, organic cationic salts are produced which are useful, not only in direct applications requiring enhanced solubility, but also as starting materials for further ion exchanges.

The organic cationic salts of the invention are well known and are used for many purposes. Organic cationic salts are optionally employed as dyes, such as spectral sensitizing dyes, photobleachable dyes and the like; development accelerators and development restrainers; ionic surface active agents; mordants; photographic stabilizers and the like.

In one preferred embodiment of this invention, the photobleachable chromylium and thiachromylium, pyrylium and thiapyrylium, flavylium and thiaflavylium cationic dyes described in Research Disclosure 17735 (1979) are employed. Useful photobleachable dyes also include pyrylium and thiapyrylium dyes disclosed, for example, in U.S. Pat. Nos. 3,671,251 and 3,300,314. The cationic portions of useful pyrylium and thiapyrylium, chromylium, thiachromylium, flavylium and thiaflavylium dyes are listed below:

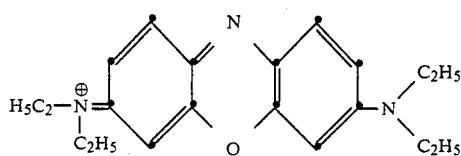

-continued

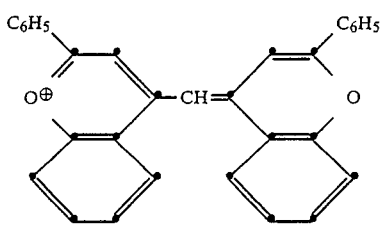

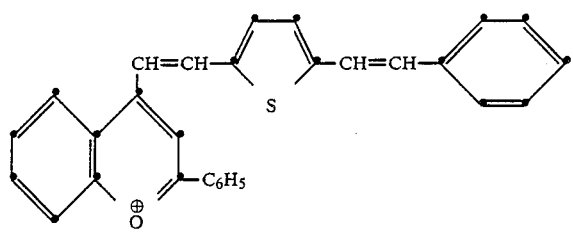

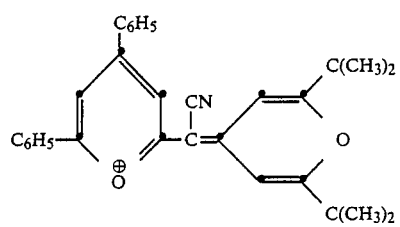

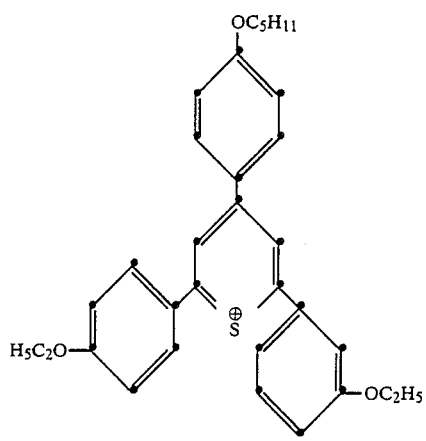

For further examples of cationic photobleachable dyes which are useful in the practice of the invention, reference is made to the above-mentioned *Research Disclosure* 17735.

The following examples further illustrate the invention.

EXAMPLE 1

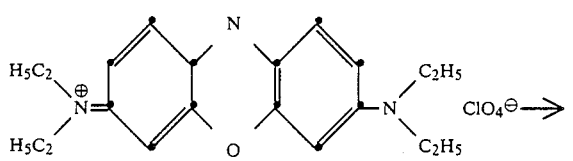

-continued

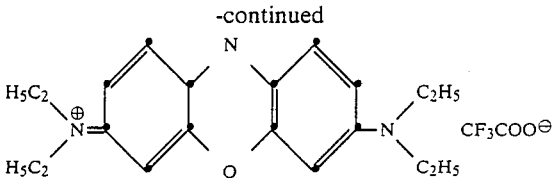

10 g of the above cationic dye salt having a perchlorate anion was dissolved in 75 ml of dichloromethane, and 10 ml of trifluoroacetic acid was added. The mixture was shaken vigorously in a separatory funnel with an equal volume of water, and the mixture was allowed to stand until phase separation occurred. The organic lower phase containing the cationic dye salt was collected and the upper aqueous phase discarded. 10 ml of trifluoroacetic acid were again added to the collected organic phase, and the extraction with an equal amount of water was repeated. The addition of acid and extraction with water were repeated two more times. The collected organic phase comprising dichloromethane and the cationic dye salt having a trifluoroacetate anion was heated in vacuo at 100° C. to evaporate the solvent and excess acid. The oily residue was cooled to room temperature to induce crystallization to form the product.

EXAMPLES 2 AND 3

Using the procedure of Example 1, the cationic dye salts of Example 1 having the following cations were prepared by substituting the following cations for the cation of Example 1.

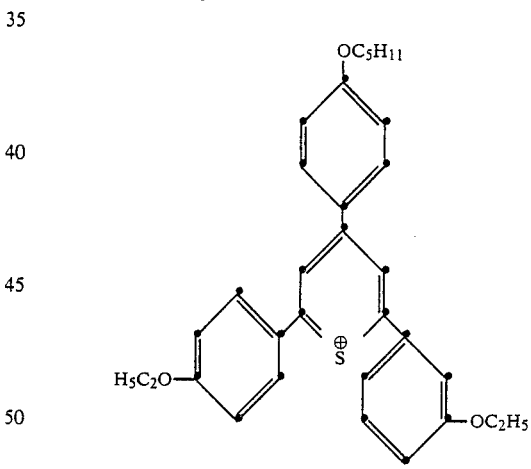

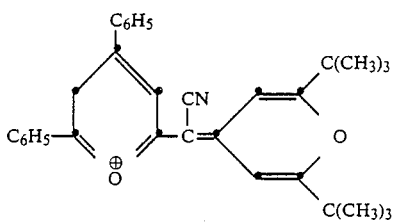

EXAMPLES 4 AND 5

The procedure of Example 1 was followed using heptafluorobutyric acid rather than trifluoroacetic acid. The following cationic dye salts having a heptafluorobutyrate anion were prepared.

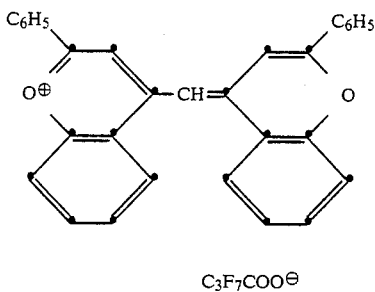

The invention has been described in detail with particular reference to preferred embodiments thereof, but it will be understood that variations and modifications can be effected within the spirit and scope of the invention.

What is claimed is:

1. A process for replacing said recovering the anion of a first organic cationic salt, said process comprising the steps of:
   (a) preparing a first dispersion or solution by combining
      (i) a first acid-stable, organic cationic salt having an anion,
      (ii) a water-immiscible organic solvent, and
      (iii) the acid of a solubilizing anion, thereby forming (1) a second organic cationic salt having said solubilizing anions, and (2) an acid of said anion of said first organic cationic salt, and (3) an excess, if any, of an acid of said solubilizing anion, said second organic cationic salt having a solubility in 2-ethoxyethanol:2-methoxyethyl acetate (1:1 by weight) at least 5 percent greater than said first organic cationic salt;
   (b) removing the acid formed in said first dispersion or solution by, at least once
      (i) mixing water with said first dispersion or solution to form a mixture comprising (1) said first dispersion or solution, which contains said second organic cationic salt having said solubilizing anion, and (2) a second solution comprising water, at least a portion of the acid formed in said first dispersion or solution, and at least a portion of any excess of said acid of said solubilizing anion, and
      (ii) separating said first dispersion or solution from said second solution; and
   (c) recovering said second organic cationic salt having said solubilizing anion from said first dispersion or solution.

2. The process of claim 1 wherein said solubilizing anion is a halogenated anion.

3. The process of claim 2 wherein said solubilizing anion is trifluoroacetate or heptafluorobutyrate.

4. The process of claim 1 wherein said water-immiscible organic solvent is dichloromethane.

5. The process of claim 1 wherein said organic cationic salt is a cationic dye salt.

6. The process of claim 5 wherein said cationic dye salt is selected from the group consisting of pyrylium, thiapyrylium, chromylium, thiachromylium, flavylium and thiaflavylium dye salts.

7. The process of claim 1 wherein recovery of said second organic cationic salt having a solubilizing anion is effected by evaporating at least a portion of said water-immiscible organic solvent from said first dispersion or solution to effect crystallization of said second organic cationic salt.

8. A process for replacing and recovering the anion of a first organic cationic salt, said process comprising the steps of:
   (a) preparing a first dispersion or solution by combining
      (i) a first acid-stable, organic cationic salt having a perchlorate or tetrafluoroborate anion,
      (ii) a water-immiscible organic solvent, and
      (iii) the acid of a solubilizing anion, thereby forming (1) a second organic cationic salt having said solubilizing anion, and (2) an acid of said anion of said first organic cationic salt, and (3) an excess, if any, of the acid of said solubilizing anion, said second organic cationic salt having a solubility in 2-ethoxyethanol:2-methoxyethyl acetate (1:1 by weight) at least 5 percent greater than said first organic cationic salt;
   (b) removing the acid formed in said first dispersion or solution by, at least once
      (i) mixing water with said first dispersion or solution to form a mixture comprising (1) said first dispersion or solution, which contains said second organic cationic salt having said solubilizing anion, and (2) a second solution comprising water, at least a portion of the acid formed in said first dispersion or solution, and at least a portion of any excess of said acid of said solubilizing anion, and
      (ii) separating said first dispersion or solution from said second solution; and
   (c) recovering said second organic cationic salt having said solubilizing anion from said first dispersion or solution.

9. The process of claim 8 wherein said solubilizing anion is selected from the group consisting of trifluoroacetate and heptafluorobutyrate.

10. The process of claim 8 wherein said water-immiscible organic solvent is dichloromethane.

11. The process of claim 8 wherein said organic cationic salt is a cationic dye salt.

12. The process of claim 11 wherein said cationic dye salt is selected from the group consisting of pyrylium, thiapyrylium, chromylium, thiachromylium, flavylium and thiaflavylium dye salts.

13. The process of claim 8 wherein recovery of said second organic cationic salt having a solubilizing anion is effected by evaporating at least a portion of said water-immiscible organic solvent from said first dispersion or solution to effect crystallization of said second organic cationic salt.

14. A process for replacing and recovering the anion of a first organic cationic salt, said process comprising the steps of:
   (a) preparing a first dispersion or solution by combining
      (i) a first acid-stable, organic cationic salt having a perchlorate or tetrafluoroborate anion,
      (ii) a water-immiscible organic solvent, and
      (iii) the acid of a halogenated solubilizing anion, thereby forming (1) a second organic cationic salt having said solubilizing anion, and (2) an acid of said perchlorate or tetrafluoroborate anion wherein said second organic cationic salt has a solubility in 2-ethoxyethanol:2-methoxyethyl acetate (1:1 by weight) at least 5 percent greater than said first organic cationic salt, and (3) an excess, if any, of an acid of said solubilizing anion:
   (b) removing the acid formed in said first dispersion or solution by, at least once (i) mixing water with said first dispersion or solution to form a mixture comprising (1) said first dispersion or solution, which contains said second organic cationic salt having said solubilizing anion, and (2) a second solution comprising water, at least a portion of the acid formed in said first dispersion or solution, and at least a portion of any excess of said acid of said solubilizing anion, and (ii) separating said first dispersion or solution from said second solution; and (c) recovering said second organic cationic salt having said solubilizing anion from said first dispersion or solution.

15. The process of claim 14 wherein said solubilizing anion is trifluoroacetate or heptafluorobutyrate.

16. The process of claim 14 wherein said water-immiscible organic solvent is dichloromethane.

17. The process of claim 14 wherein recovery of said second organic cationic salt having a solubilizing anion is effected by evaporating at least a portion of said water-immiscible organic solvent from said first dispersion or solution to effect crystallization of said second organic cationic salt.

18. The process of claim 14 wherein said organic cationic salt is a cationic dye salt.

19. The process of claim 18 wherein said cationic dye salt is selected from the group consisting of pyrylium, thiapyryplium, chromylium, thiachromylium, flavylium and thiaflavylium dye salts.

20. A process for replacing and recovering the anion of a first organic cationic dye salt, said method comprising the steps of:

(a) preparing a first dispersion or solution by combining
 (i) a first acid-stable, organic cationic salt having a perchlorate anion,
 (ii) dichloromethane solvent, and (iii) the acid of a solubilizing anion selected from the group consisting of trifluoroacetate and heptafluorobutyrate, thereby forming (1) a second organic cationic salt having said solubilizing anion, and (2) an acid of said perchlorate anion wherein said second organic cationic salt has a solubility in 2-ethoxyethanol:2-methoxyethyl acetate (1:1 by weight) at least 5 percent greater than said first organic cationic salt, and 3) an excess, if any, of an acid of said solubilizing anion;

(b) removing the acid of said perchlorate anion formed in said first dispersion or solution by, at least once
 (i) mixing water with said first dispersion or solution to form a mixture comprising (1) said first dispersion or solution, which contains said second organic cationic salt having said solubilizing anion, and (2) a second solution comprising water, at least a portion of the acid formed in said first dispersion or solution, and at least a portion of an excess of said acid of said solubilizing anion, and
 (ii) separating said first dispersion or solution from said second solution; and (c) recovering said second organic cationic salt having a solubilizing anion from said first dispersion or solution.

21. The process of claim 20 wherein said cationic dye salt is selected from the group consisting of pyrylium, thiapyrylium, chromylium, thiachromylium, flavylium and thiaflavylium dye salts.

22. The process of claim 20 wherein recovery of said second organic cationic dye salt having said solubilizing anion is effected by evaporating at least a portion of the dichloromethane solvent from said first dispersion or solution to effect crystallization of said second organic cationic dye salt.

* * * * *